US008200800B2

(12) United States Patent
Bolan et al.

(10) Patent No.: US 8,200,800 B2
(45) Date of Patent: Jun. 12, 2012

(54) REMOTELY ADMINISTERING A SERVER

(75) Inventors: Joseph E. Bolan, Cary, NC (US); James R. Goffena, Chapel Hill, NC (US); Sumeet Kochar, Apex, NC (US); Adam L. Soderlund, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 12/402,879

(22) Filed: Mar. 12, 2009

(65) Prior Publication Data

US 2010/0235484 A1 Sep. 16, 2010

(51) Int. Cl.
*G06F 15/173* (2006.01)
(52) U.S. Cl. ........................................ 709/223
(58) Field of Classification Search ................... 709/223
See application file for complete search history.

(56) References Cited

U.S. PATENT DOCUMENTS

| | | | |
|---|---|---|---|
| 5,559,958 | A | 9/1996 | Farrand et al. |
| 6,708,297 | B1 | 3/2004 | Bassel |
| 2004/0267924 | A1 | 12/2004 | Yang et al. |
| 2005/0055428 | A1* | 3/2005 | Terai et al. .................. 709/220 |
| 2005/0159927 | A1 | 7/2005 | Cruz et al. |
| 2007/0088974 | A1 | 4/2007 | Chandwani et al. |
| 2008/0059626 | A1 | 3/2008 | Campbell et al. |

OTHER PUBLICATIONS

Brey, et al.; Blade Center Chassis Management; IBM Journal of Research and Development; Oct. 7, 2005; pp. 1-22; IBM JRD 49-6; United States.
Tsuneya; New Management Technologies for Blade Servers; Fujitsu Sci. Tech. J.; Jun. 2004; pp. 141-150; 40,1.

* cited by examiner

*Primary Examiner* — Jerry Dennison
(74) *Attorney, Agent, or Firm* — Edward J. Lenart; Cynthia G. Seal; Biggers & Ohanian, LLP (57) ABSTRACT

Remotely administering a server, the server including non-volatile memory upon which is disposed one or more digital images representing the server, the server also including one or more components each of which includes non-volatile memory in which is disposed one or more digital images representing the component, where the server is connected for data communications to a management module, and remotely administering the server includes: retrieving, by the management module from the server, the digital images representing the server and the digital images representing the installed components; generating, by the management module with the digital images representing the server and the digital images representing the installed components, a graphical representation of the server with the installed components; and presenting, by the management module to a user through a GUI, the graphical representation of the server with the installed components.

20 Claims, 6 Drawing Sheets

REMOTELY ADMINISTERING A SERVER

BACKGROUND OF THE INVENTION

1. Field of the Invention

The field of the invention is data processing, or, more specifically, methods, apparatus, and products for remotely administering a server.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are often implemented as servers in a data center where many hundreds or thousands of similar computer systems are installed. In such a data center server maintenance, both software and hardware maintenance is difficult to administer. Currently, when a fault occurs in a server in such a data center, a system technician must physically travel to the location of the server, inspect the server, identify the current configuration of components installed in the server, troubleshoot the fault, and identify any faulty components. Upon identification of the faulty component of a server, the system technician then must travel to a storage location of replacement components, retrieve a replacement component for the faulty component, and travel back to the server to replace the faulty component. This multi-trip maintenance is time-consuming and inefficient. In fact, in large data centers that covers thousands of square feet, the multi-trip maintenance is extremely costly in terms of system technician time. Furthermore, information describing the fault occurring in a server is typically located in various different fault logs, stored in different computer storage locations. Such information describing a particular fault is also typically difficult to locate with a particular fault log itself.

SUMMARY OF THE INVENTION

Methods, apparatus, and products for remotely administering a server are disclosed in which the server includes non-volatile memory upon which is disposed one or more digital images representing the server, the server also includes one or more components installed in the server with each component also including non-volatile memory in which is disposed one or more digital images representing the component, the server is connected for data communications to a management module, and remotely administering the server includes: retrieving, by the management module from the server, the digital images representing the server and the digital images representing the installed components; generating, by the management module with the digital images representing the server and the digital images representing the installed components, a graphical representation of the server with the installed components; and presenting, by the management module to a user through a graphical user interface ('GUI'), the graphical representation of the server with the installed components.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
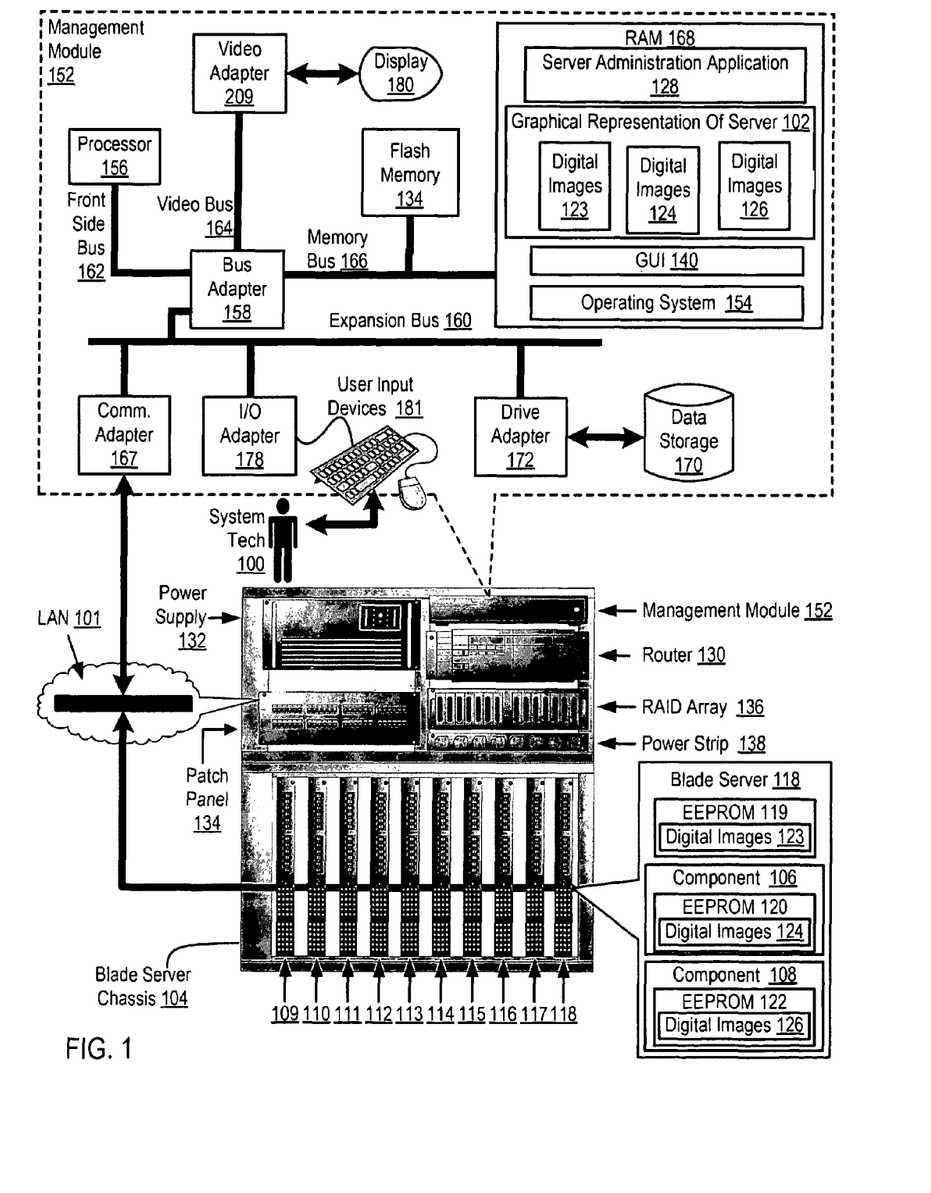
FIG. 1 sets forth a network diagram of an exemplary system for remotely administering one or more servers according to embodiments of the present invention.

Exemplary methods, apparatus, and products for remotely administering a server in accordance with the present invention are described with reference to the accompanying drawings, beginning with FIG. 1. FIG. 1 sets forth a network diagram of an exemplary system for remotely administering one or more servers (109-118) according to embodiments of the present invention. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

The system of FIG. 1 includes ten servers (109-118) implemented as blade servers and installed in a blade server chassis (104). Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

A blade server chassis (104) is a particular type of server rack, a frame or enclosure configured for mounting various electronic modules, servers, and other electronic equipment that supports server operation. Installed in the example blade server chassis (104) of FIG. 1 is a power supply (132) that delivers power to the blade servers (109-118) and other electronic equipment installed in the blade server chassis (104), a panel patch (134) that provides data communications connection among the servers, a router (130) the enables data communications among the the servers (109-118) and with a wide area data communications network such as the Internet, a redundant array of inexpensive drives ('RAID array') (136) providing data storage and backup services to the blade servers (109-118), and a power strip (138) that distributes power from the power supply (132) to the electronic devices installed in the blade server chassis (104).

Although any one or all of the blade servers (109-118) installed in the blade server chassis (104) of FIG. 1 may be remotely administered in accordance with embodiments of the present invention, consider, for ease of explanation, the blade server (118) as an example of such a server that is remotely administered according to embodiments of the present invention. The blade server (118) in the system of FIG. 1 includes non-volatile memory, such as EEPROM (Electrically Erasable Programmable Read Only Memory) upon which is disposed one or more digital images representing the server (118).

A digital image is a binary representation of a two- or three-dimensional image. A two-dimensional digital image may be of vector or raster type. Raster images have a finite set of digital values, called picture elements or pixels. The raster-type digital image contains a fixed number of rows and columns of pixels. Pixels are the smallest individual element in an image, holding quantized values that represent the brightness of a given color at any specific point. Such pixels may be stored in computer memory as a raster image or raster map, a two-dimensional array of small integers. These values may be transmitted or stored in a compressed form. Vector images, in contrast to raster images, are made up of geometrical primitives such as points, lines, curves, and shapes or polygons, all of which are derived from mathematical equations.

Digital images may be files stored in file formats of GIF, TGA, JPEG, TIFF, BMP, a 3D wireframe file format with one or more corresponding raster images, and so on as will occur to readers of skill in the art. Digital images representing a server may be implemented in various ways including, for example, as pictures captured with a digital camera, line drawings generated by a user-level graphics software application at the behest of a user, functional block diagrams of the server, 3-Dimensional wireframe models of the server with raster overlays, and so on as will occur to readers of skill in the art.

A digital image that represents a server is a depiction of the base model, a default model, of that server. A default model of a server typically, but not always, consists of an enclosure of particular dimensions that includes at least a motherboard. The motherboard may have connection adapters for one or more processors, one or more memory modules, I/O cards, network cards, and so on. In other instances, instead of being arranged in a very thin configuration, having relatively few components installed, a default model of a server may be configured with any number of components installed. A default model server having one or more components installed for operation is referred to in this specification, as context requires, as a 'fully configured server,' a 'server with installed components,' or merely a 'server'. The manufacturer of the default model of the server may store the digital images representing the server in non-volatile memory of the server, such as in EEPROM (119), at manufacturing time.

Installed in the blade server (118) are several components (106, 108). Examples of components capable of being installed in a server include graphics adapters, network adapters, memory modules, I/O adapters, disk drive adapters, and so on as will occur to readers of skill in the art. Like the default model of the server (118) itself, each of the installed components (106, 108) includes non-volatile memory, EEPROM (120, 122), in which is disposed one or more digital images (124, 126) representing the component. That is, stored in memory of a particular component are digital images of that particular component. The manufacturer of each component, at manufacturing time, may store such digital images in the EEPROM of the component before shipping the component to the end user. FIG. 1 illustrates digital images (124) of the component (106) stored in EEPROM (120) of the component (106) and digital images (126) of the component (108) stored EEPROM (122) of the component (108).

The example blade servers (109-118) are connected for data communications through a data communications network, a local area network ('LAN') (101) in the example of FIG. 1, to a management module (152). Although the data communications network connecting the blade servers (109-118) for data communications with the management module (152) in the example of FIG. 1 is a LAN, typically implemented as an in-band network with Ethernet connections, switches, routers, and the like, readers of skill in the art will immediately recognize that a data communications network connecting a management module (152) to blade servers (109-118) may also be implemented as an out-of-band network with such out-of-band communications links as, for example, as a Low Pin Count ('LPC') bus, an Inter-Integrated Circuit ('I2C') bus, a System Management Bus ('SMBus'), a Serial Peripheral Interface ('SPI') Bus, a Universal Serial Bus ('USB'), and so on as will occur to those of skill in the art. In some embodiments, for example, the management module (152) is connected to a particular blade server through an out-of-band communications link and a baseboard management controller ('BMC') installed in the particular blade server or installed in the mid-plane or back-plane of the blade server chassis (104), with the BMC dedicated individually to the particular blade server and no others.

A management module (152) generally is an aggregation of computer hardware and software that provides support services for computing devices, such as blade servers. Support services provided by the management module (152) include monitoring health of servers (109-118), reporting health statistics to a system management server, power management and power control, save and restore configurations, discovery of available computing devices, event log management, memory management, and so on. An example of a management module that can be adapted for use in systems for remotely administering a server according to embodiments of the present invention is IBM's Advanced Management Module ('AMM').

The management module (152) in the example of FIG. 1 is automated computing machinery, a computer, configured for remote administration of a server (109-118) according to embodiments of the present invention. The management module (152) includes at least one computer processor (156) or 'CPU' as well as random access memory (168) ('RAM')

which is connected through a high speed memory bus (166) and bus adapter (158) to processor (156) and to other components of the computer (152).

Stored in RAM (168) of the management module (152) is a server administration module (128), a module of computer program instructions that causes the management module (152) to remotely administer a server according to embodiments of the present invention by: retrieving, by the management module (152) from the server (118), the digital images (123) representing the server (118) and the digital images (124, 126) representing the installed components (106, 108); generating, by the management module (152) with the digital images (123) representing the server (118) and the digital images (124, 126) representing the installed components (106, 108), a graphical representation (102) of the server (118) with the installed components (106, 108); and presenting, by the management module (115) to a user, a system technician (100), for example, through a graphical user interface ('GUI') (140), the graphical representation (102) of the server (118) with the installed components (106, 108).

The example management module (152) of FIG. 1 may retrieve, from the server (118), the digital images (123) representing the server (118) and the digital images (124, 126) representing the installed components (106, 108) through data communications network (101) or an out-of-band bus in dependence upon the implementation of the data communications connection between the management module and the server. The management module may carry out such a retrieval of the digital images (123, 124, 126) in various ways including for example: by sending a request for the images in a data communications message to a module of firmware, a module of computer program instructions, executing on the server (118); by reading, from non-volatile computer memory of the server at a predefined memory address, data representing the images; by receiving the images in a data communications message transmitted by a module of computer firmware executing on the server, without request by the management module; and in other ways as will occur to readers of skill in the art. Such a retrieval may be carried out at various times, including for example: upon installation of the server (118) in the blade server chassis (104); periodically at a predefined intervals of time; as part of a Power On Self Test ('POST') procedure carried out by a Basic Input Output Services ('BIOS') module of the server (118) when the server is powered-on; dynamically, during operation of the management module and server upon a detected fault of a component of the server; and at other times as may occur to readers of skill in the art.

The management module in retrieving the digital images may include additional information describing the server, its configuration, components installed in the server, characteristics of the components, status of the components and so on. Such information may enhance the remote administration of the server by providing a system technician with a detailed description of the various aspects of the server. Such information may be included in metadata associated with an image, particular pixels of the image, or in another data structure entirely.

The example management module (152) of FIG. 1 may generate, with the digital images (123, 124, 126), a graphical representation (102) of the server (118) with the installed components (106, 108) in various ways. One such way of generating a graphical representation of the fully configured server includes overlapping the digital images according to markers embedded within the images and metadata describing the components, server, and markers. That is, the management module may overlap different images in dependence upon particular corresponding points of the different images, one upon another in accordance with the metadata describing the markers, and merge the various layers into a single layer. Readers of skill in the art will immediately recognize that this is just one way of generating a graphical representation from multiple images, recited here for clarity of explanation, not limitation. In fact, there are many other ways of generating such a graphical representation in dependence upon the format of the digital images themselves, whether a JPG, BMP, 3D wireframe model, vector image, raster image and each such way is well within the scope of the present invention.

The example management module (152) of FIG. 1 may present, through a graphical user interface ('GUI') (140) to a system technician (100), the graphical representation (102) of the server (118) with the installed components (106, 108) by rendering the graphical representation on a display (180). A GUI is a type of user interface which enables a user to interact with electronic devices such as computers; hand-held devices such as MP3 Players, Portable Media Players or Gaming devices, household appliances, and office equipment. A GUI may present graphical icons and visual indicators, in contrast to text-based interfaces, typed command labels, or text navigation, to fully represent the information and actions available to a user. Actions are usually carried out or initiated direct manipulation of the graphical elements, through user I/O devices, a mouse or keyboard for example, controlled by a user.

A system technician (100) maintains server hardware, components of the servers, replaces components in the servers when a component fails, maintains other hardware in a blade server chassis and so on. In the prior art, a system technician received information describing a fault from a management module directly or through a client computer, identified the server configuration and identified a faulty component by visually inspecting the server, blade server chassis, or the like. That is, the system technician was required to be physically present at the location of the server to determine a server's present configuration of installed components and identify and troubleshoot a particular fault in a server. Once the faulty component was identified the system technician then retrieved a replacement component from storage and replaced the faulty component in the server. Such a storage location and the management module itself, however, in a large data center may be located at significant distance from the server itself, requiring the system technician to first travel from the management module to the server, then fro the server to the storage location, then from the storage location back to the server. That is, administration of a server in the prior art is not 'remote' but instead requires a system technician to be physically present at the server multiple times.

By contrast the remote administration of the server (118) carried out by the management module (152) in the example of FIG. 1, is 'remote' in that a system technician (100) need not be physically present with a particular server to identify a faulty component of the server, identify the present configuration of a particular server, and so on. Such 'remote administration' carried out according to embodiments of the present invention may include pushing firmware or software updates to the server via data communications over a data communications network, remotely restarting a software application or the server itself, installing and executing a service application, quarantining the server hardware or software, and so on. Another way of remotely administering a server is to send a system technician to the server with the correct component for replacement. Instead of traveling from the management module or technician's client computer to the server to identify a fault component, then traveling from the server to a storage location to retrieve a replacement component, then traveling back to the server to replace the faulty component with the replacement component—the system technician travels only once to the server having in the technician's possession, the correct replacement component.

Also stored in RAM (168) of the management module is an operating system (154). Operating systems useful for remotely administering a server according to embodiments of the present invention include UNIX™, Linux™, Microsoft XP™, AIX™, IBM's i5/OS™, and others as will occur to those of skill in the art. The operating system (154), server administration module (128), graphical representation of the server (102) and GUI (140), in the example of FIG. 1 are shown in RAM (168), but many components of such software typically are stored in non-volatile memory also, such as, for example, on a disk drive (170), EEPROM, Flash memory (134), and so on.

The management module (152) of FIG. 1 includes disk drive adapter (172) coupled through expansion bus (160) and bus adapter (158) to processor (156) and other components of the management module (152). Disk drive adapter (172) connects non-volatile data storage to the management module (152) in the form of disk drive (170). Disk drive adapters useful in management modules that remotely administer servers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management module (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management module (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary management module (152) of FIG. 1 includes a communications adapter (167) for data communications with other computers, servers (109-118), and for data communications with a data communications networks. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for remotely administering a server according to embodiments of the present invention include modems for wired dial-up communications, Ethernet (IEEE 802.3) adapters for wired data communications network communications, and 802.11 adapters for wireless data communications network communications.

The arrangement of servers (109-118), components (106-108), networks (101), management module (152), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
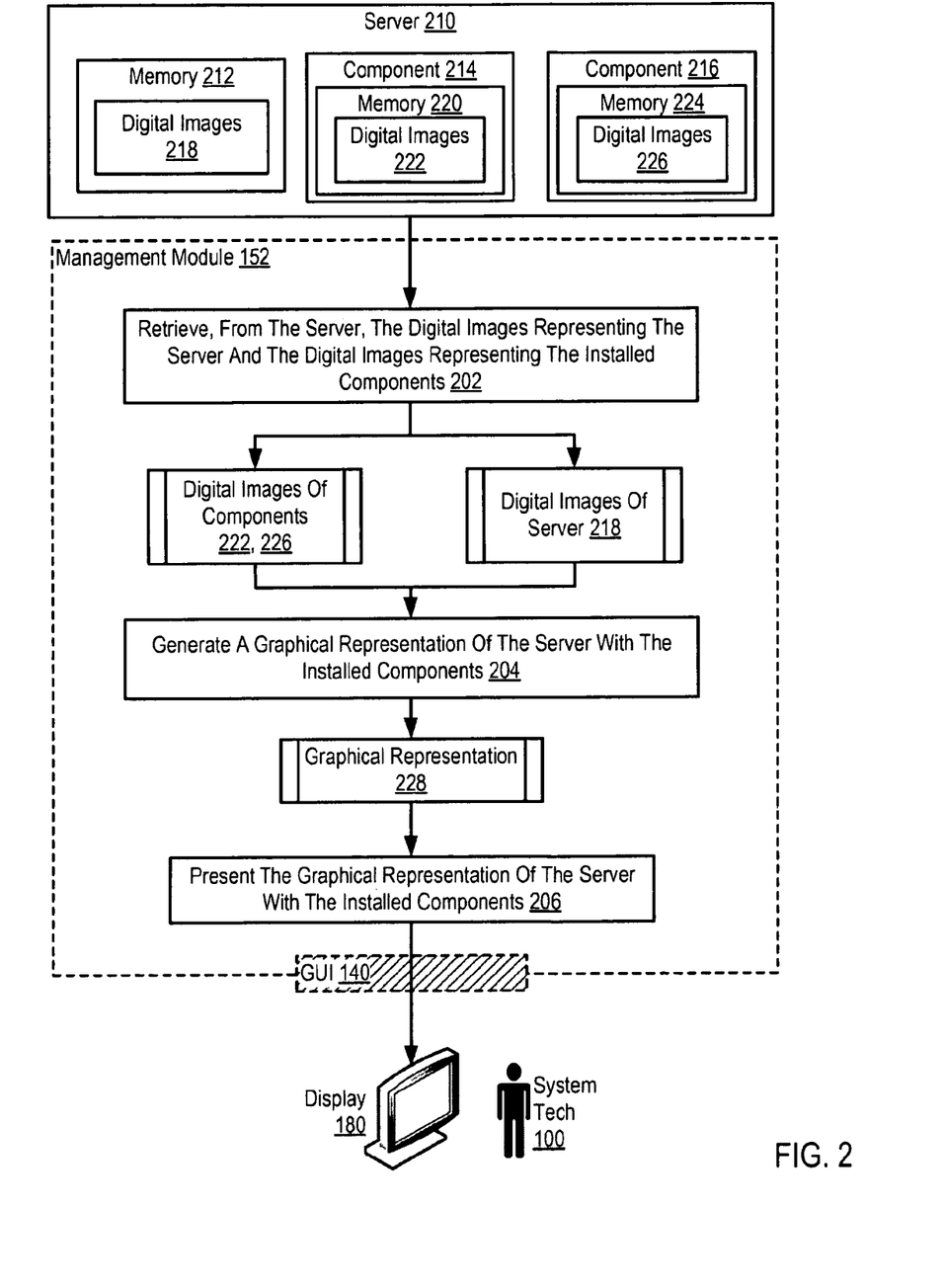
FIG. 2 sets forth a flow chart illustrating an exemplary method for remotely administering a server according to embodiments of the present invention.

For further explanation, FIG. 2 sets forth a flow chart illustrating an exemplary method for remotely administering a server (210) according to embodiments of the present invention. In the method of FIG. 2, the server (210) includes non-volatile memory (212) upon which is disposed one or more digital images (218) representing the server. The server (210) also includes one or more components (214, 216) installed in the server with each of the installed components (214, 216) including non-volatile memory (220, 224) in which is disposed one or more digital images (222, 226) representing the component. The server (210), similar to the example blade serer (118) of FIG. 1, is connected for data communications to a management module (152).

The method of FIG. 2 includes retrieving (202), by the management module (152) from the server (210), the digital images (218) representing the server (210) and the digital images (222, 226) representing the installed components (214, 216). Retrieving (202) the digital images (218, 222, 226) may be carried out through data communications network or an out-of-band bus, in various ways including for example: by sending a request for the images in a data communications message to a module of firmware, a module of computer program instructions, executing on the server (210); by reading, from non-volatile computer memory (212) of the server (210) at a predefined memory address, data representing the images; by receiving the images in a data communications message transmitted by a module of computer firmware executing on the server, without request by the management module (152); and in other ways as will occur to readers of skill in the art. Such a retrieval may be carried out at various times, including for example: upon installation of the server (210) in a server rack; periodically at a predefined intervals of time; as part of a Power On Self Test ('POST') procedure carried out by a Basic Input Output Services ('BIOS') module of the server (210) when the server is powered-on; dynamically, during operation of the management module and server upon a detected fault of a component of the server; and at other times as may occur to readers of skill in the art. BIOS of the server, for example, during POST may form and transmit to the management module (152) one or more data communications messages including as payload of the messages, images of components and the server itself, metadata associated with the images, and other configuration information stored in memory (212, 220, 224) of the server (210) and the components (214, 216), The method of FIG. 2 also includes generating (204), by the management module (152) with the digital images (218) representing the server and the digital images (222, 226) representing the installed components (214, 216), a graphical representation (228) of the server (210) with the installed components (214, 216). Generating (204) a graphical representation (228) of the server (210) with the installed components (214, 216) may be carried out in various ways. One such way of generating a graphical representation of the fully configured server includes overlapping the digital images according to markers embedded within the images and metadata describing the components, server, and markers. That is, the management module may overlap different images in dependence upon particular corresponding points of the different images, one upon another in accordance with the metadata describing the markers, and merge the various layers into a single layer. Readers of skill in the art will recognize that is just one exemplary way of generating such a graphical representation from multiple digital images, described here for explanation, not limitation.

The method of FIG. 2 also includes presenting (206), by the management module (152) to a user (100) through a graphical user interface ('GUI') (140), the graphical representation (228) of the server (210) with the installed components (214, 216). Presenting (206) the graphical representation (228) of the server (210) with the installed components (214, 216) may be carried out by rendering the graphical representation on a computer display (180) or by attaching the graphical representation to an email and sending the email to a system technician (100), or in other ways as may occur to readers of skill in the art.

Figure 3:
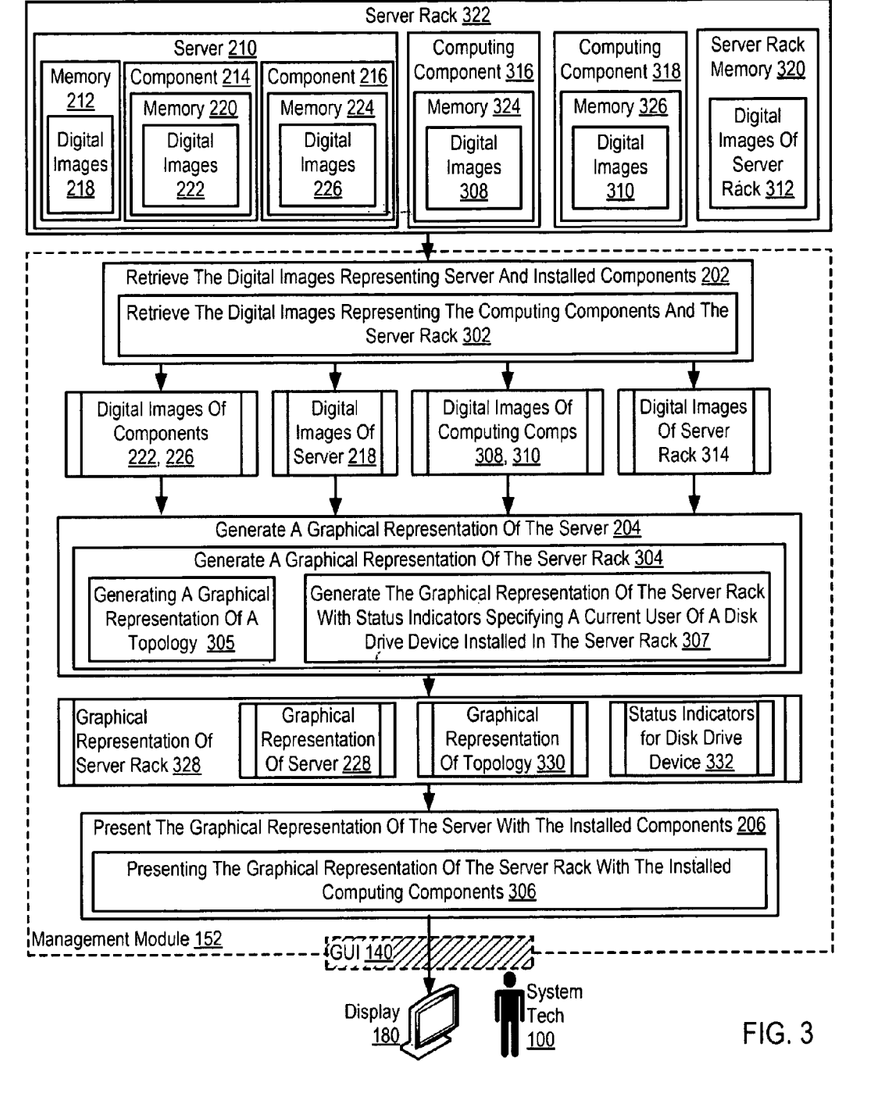
FIG. 3 sets forth a flow chart illustrating a further exemplary method for remotely administering a server according to embodiments of the present invention.

For further explanation, FIG. 3 sets forth a flow chart illustrating a further exemplary method for remotely administering a server (210) according to embodiments of the present invention. The method of FIG. 3 is similar to the method of FIG. 2 in that in the method of FIG. 3, the server (210) includes non-volatile memory (212) upon which is disposed one or more digital images (218) representing the server, the server (210) includes one or more components (214, 216) with each of the components (214, 216) including non-volatile memory (220, 224) in which is disposed one or more digital images (222, 226) representing the component, and the server (210) is connected for data communications to a management module (152). The method of FIG. 3 is also similar to the method of FIG. 2 in that the method of FIG. 3 also includes the management module's retrieving (202), the digital images (218, 222, 226), generating (204) a graphical representation (228) of the server (210) with the installed components (214, 216), and presenting (206) the graphical representation (228) to a user (100) through a GUI (140).

The method of FIG. 3 differs from the method of FIG. 2 however in that in the method of FIG. 3 the server (210) is installed in a server rack (322) that includes non-volatile memory (320) in which is disposed one or more digital images (312) representing the server rack (322). A server rack is a chassis in which many servers and server support devices, referred to here as computing components, may be installed. One example server rack is illustrated in the system of FIG. 1, the blade server chassis (104).

The example server rack (322) of FIG. 3 includes several computing components (316, 318) installed in the server rack (322). Each computing component (316, 318), in a manner similar to the server (210), is connected for data communications to the management module (152) and includes non-volatile memory (324, 326) in which is disposed one or more digital images (308, 310) representing the computing component (316, 318).

A computing component is any device, component, aggregation of hardware or software, or some combination thereof, installed in a server rack and supporting server operations of any type for servers installed in the same server rack. Such computing components support server operations in a variety of manners including by providing no actual computing functions. Power supplies, for example, support server operations by providing power, but typically no computing functions. Other computing components, however, such as routers, may provide some level of computing function in supporting server operations. The example computing components (316, 318) of FIG. 3 may be implemented as additional servers with installed components, networking devices that connect servers installed in the server rack for data communications through a data communications network, input/output ('I/O') devices, and one or more disk drive devices. Readers of skill in the art will immediately recognize that these computing components are but a few examples of the many different possible computing components which may be installed in a server rack configured for remote administration in accordance with embodiments of the present invention. Other example computing components are installed in the blade server chassis (104) illustrated in FIG. 1 including the router (130 on FIG. 1), RAID array (136 on FIG. 1), patch panel (134 on FIG. 1), and power strip (138 on FIG. 1).

In the method of FIG. 3, retrieving (202) the digital images (218) representing the server (210) and the digital images (222, 226) representing the installed components (214, 316) includes retrieving (302) the digital images (308, 310) representing the computing components (316, 318) installed in the server rack (322) and the digital images (314) representing the server rack (322). Retrieving (302) the digital images (308, 310, 314) may be carried out by retrieving the digital images through an out-of-band bus connecting the computing components and server rack to management module for data communications.

In the method of FIG. 3, generating (204) a graphical representation (228) of the server (210) with the installed components (214, 216) includes generating (304), with the digital images (308, 310) representing the computing components (316, 318) installed in the server rack (322) and the digital images (312) representing the server rack (322), a graphical representation (328) of the server rack (322) with the installed computing components (316, 318). Generating (304) a graphical representation (328) of the server rack (322) may be carried out in various ways including, for example, in the manner described above with respect to generating the graphical representation of a server, that is, overlaying images one on top of another and merging the layers of images into a single graphical representation. Another way of generating a graphical representation of the server rack (322) may include embedding hyperlinks at computing component and server locations in the graphical representation of the server rack. Each hyperlink may specify a particular image corresponding to the computing component or server location of the graphical representation of the server rack at which the hyperlink is embedded. In this way, a user a user may invoke an embedded hyperlink in the graphical representation of the server rack at a component or server location and the image of the computing component or server installed in that location will be presented and displayed.

Generating (304) a graphical representation (328) of the server rack (322) in the method of FIG. 3 also includes generating (305) a graphical representation (330) of a topology of data communications connections among the computing components (316, 318) of the server rack (322) as part of the graphical representation (328) of the server rack (322). A topology is the arrangement or mapping of the elements, links, nodes, endpoints, and so on, of a data communications network, especially the real and logical, that is, virtual, interconnections between nodes—in this example servers. Generating (305) a graphical representation (330) of a topology of data communications connections may be carried out by color coding endpoints, connecting the endpoints with different colored lines, embedding hyperlinks at each endpoint such that upon invocation of one hyperlink, that is one endpoint, another endpoint of a presently connected data communications path is displayed, highlighted, or otherwise specified. The information describing such a topology may be retrieved from many different sources, such as for example, from a patch panel, network switch, router, communications adapters of the servers, operating systems of the servers, and so on as will occur to readers of skill in the art.

Generating (304) a graphical representation (328) of the server rack (322) in the method of FIG. 3 also includes generating (307) the graphical representation (328) of the server rack (322) with status indicators (332) specifying a current user of a disk drive device installed in the server rack (322). A status indicator (332) is a visual indication of a current user of a disk drive device, such as a optical drives: Compact Disk ('CD') ROM drives, Digital Video Disk ROM drives, Floppy Disk drives, and so on. A 'user' as described here with respect to the disk drive device may be a software application running on a particular server. In many blade server chassis and server racks, the servers installed in the chassis or rack share use of a single CD ROM drive, and for a system technician to identify the server presently using the CD ROM drive, the technician, in prior art, inspects status indicators, LEDs, that when lit represent a particular server by server slot in the chassis or rack—LED 1 represents the server installed in slot 1, LED 2 represents slot 2, and so on for example. With the graphical representation of the server rack including a representation of such status indicators specifying the current user of a disk drive device, the system technician need not be present at the server rack to identify the current user of the disk drive device.

Presenting (206) the graphical representation (228) to a user (100) through a GUI (140) includes presenting (206) the graphical representation (328) of the server rack (322) with the installed computing components (316, 318). Presenting (206) the graphical representation (328) of the server rack (322) with the installed computing components (316, 318) may be carried out by rendering the graphical representation on the display (180) in a GUI window for a system technician (100), attaching the graphical representation to an email and sending the email to a system technician, and in other ways as will occur to readers of skill in the art.

Figure 4:
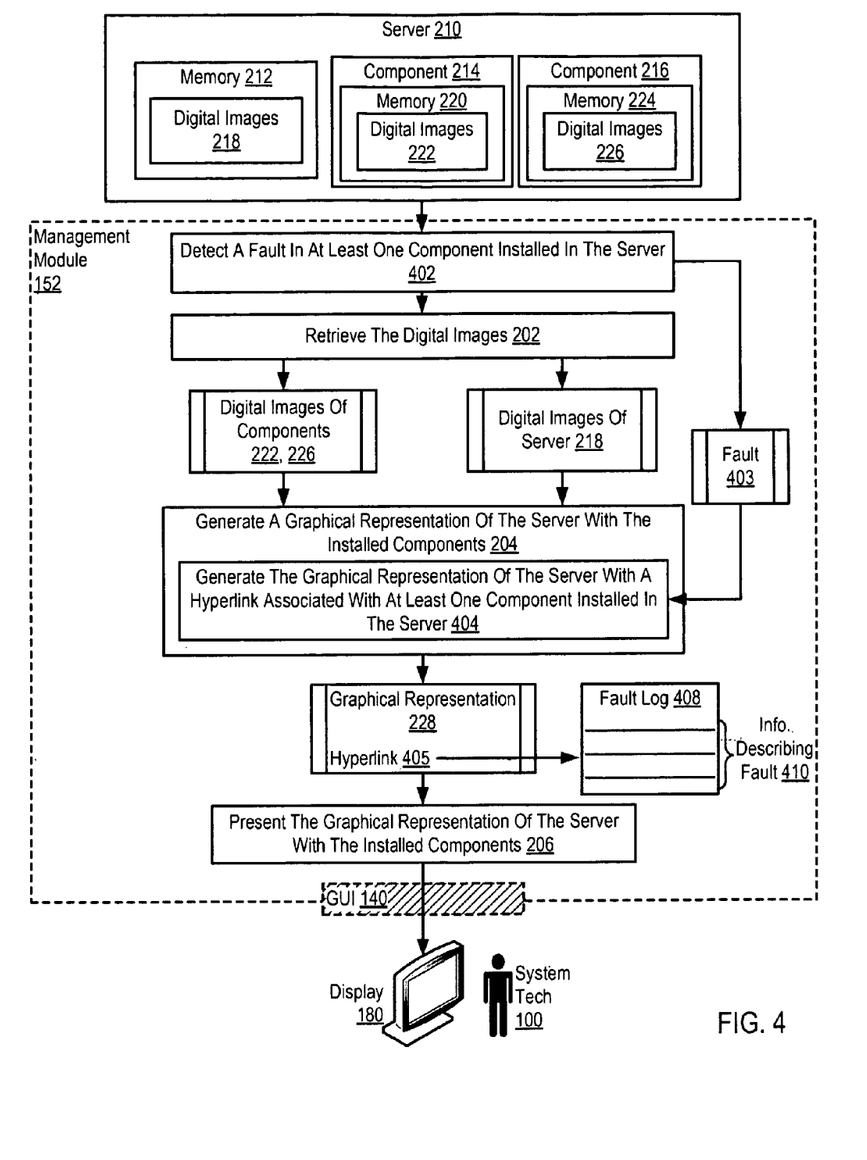
FIG. 4 sets forth a flow chart illustrating a further exemplary method for remotely administering a server according to embodiments of the present invention.

For further explanation, FIG. 4 sets forth a flow chart illustrating a further exemplary method for remotely administering a server (210) according to embodiments of the present invention. The method of FIG. 4 is similar to the method of FIG. 2 in that in the method of FIG. 4, the server (210) includes non-volatile memory (212) upon which is disposed one or more digital images (218) representing the server, the server (210) includes one or more components (214, 216) with each of the components (214, 216) including non-volatile memory (220, 224) in which is disposed one or more digital images (222, 226) representing the component, and the server (210) is connected for data communications to a management module (152). The method of FIG. 4 is also similar to the method of FIG. 2 in that the method of FIG. 4 also includes the management module's retrieving (202), the digital images (218, 222, 226), generating (204) a graphical representation (228) of the server (210) with the installed components (214, 216), and presenting (206) the graphical representation (228) to a user (100) through a GUI (140).

The method of FIG. 4 differs from the method of FIG. 2, however, in that the method of FIG. 4 also includes detecting (402), by the management module (152), a fault (403) in at least one component installed in the server (210). Detecting (402) a fault (403) in at least one component installed in the server (210) may be carried out in various ways including, for example, by receiving a fault notification from the server through an out-of-band bus, identifying a failure in primary, in-band data communications, and in other ways as will occur to readers of skill in the art.

In the method of FIG. 4, generating (204) a graphical representation (228) of the server (210) with the installed components (214, 216) includes generating (404) the graphical representation (228) of the server (210) with a hyperlink (405) embedded in the graphical representation where the hyperlink (405) specifies a location in a fault log file (408) that includes information (410) describing the detected fault (403). A fault log file is a file that includes information describing faults detected in components of servers. The management module, a system management server, the server itself all may maintain separate fault logs. In prior art, a system technician would have to search through each fault log to identify the portion of the fault describing a current fault. Imbedding a hyperlink in the graphical representation of the server according to embodiments of the present invention enables a system technician to quickly locate the portion of the fault logs in which the current fault is described.

Generating (404) the graphical representation (228) of the server (210) with a hyperlink (405) embedded in the graphical representation may be carried out with an image map, a list of coordinates relating to a digital image, created in order to hyperlink areas of the image to various destinations, in contrast to a typical image link, in which the entire area of the image links to a single destination. The intention of an image map is to provide a way of linking various parts of an image without dividing the image into separate image files. The detected fault (403), that is the data representing the fault, may identify the faulty component by component ID, MAC address, IP address, or some other unique or semi-unique identifier. The management module may use such an identifier to form a hyperlink to a log file in which the identifier is an index into information describing the fault and the faulty component. This is but one way among many to embed a hyperlink in the graphical representation of the server described here for explanation not limitation.

The hyperlink may be embedded in the graphical representation such that a system technician is presented with the fault log upon invoking the hyperlink with a mouse, a user input device. The hyperlink may be embedded in various portions of the image, such as for example, in the graphical representation of the faulty component, in a status indicator specifying a faulty component, and so on. That is, to retrieve a fault log including information describing the present fault, the system technician need only invoke a mouse click when the mouse pointer is located over the faulty component or located over the status indicator specifying the faulty component.

Figure 5:
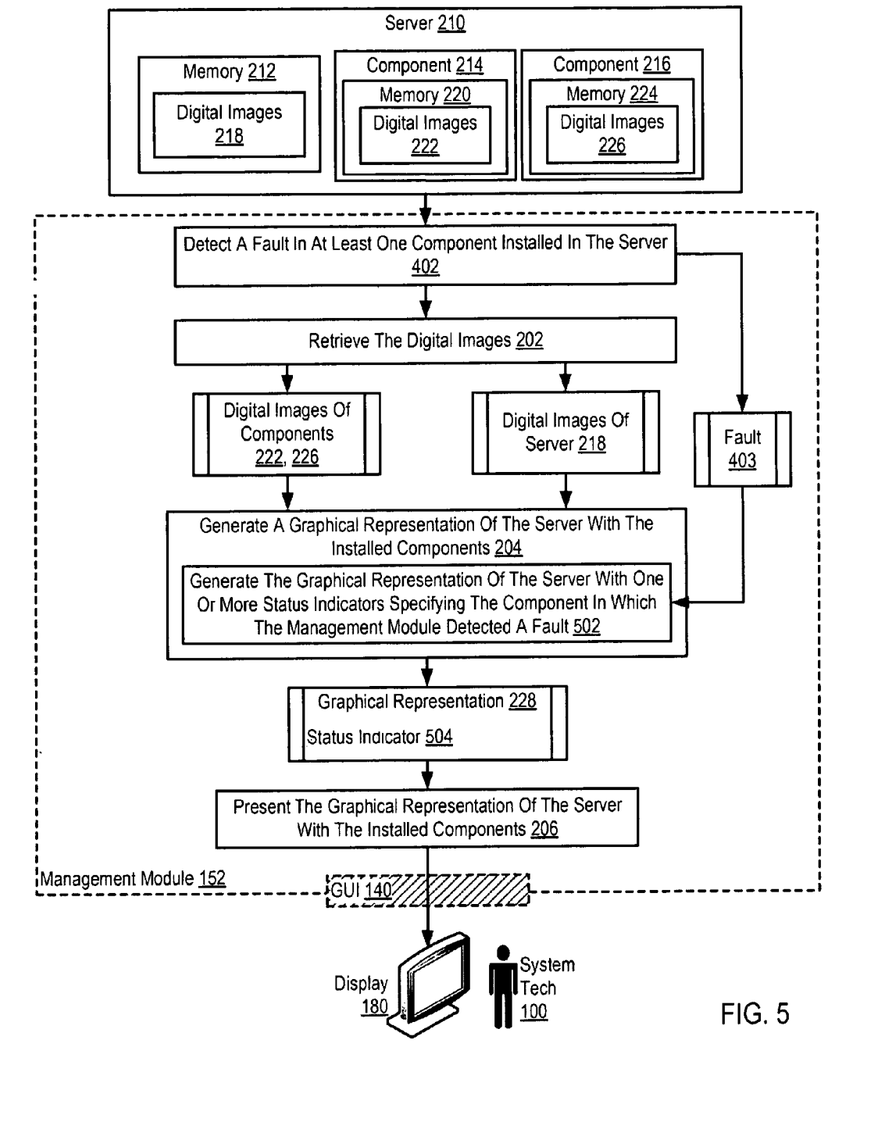
FIG. 5 sets forth a flow chart illustrating a further exemplary method for remotely administering a server according to embodiments of the present invention.

For further explanation, FIG. 5 sets forth a flow chart illustrating a further exemplary method for remotely administering a server (210) according to embodiments of the present invention. The method of FIG. 5 is similar to the method of FIG. 2 in that in the method of FIG. 5, the server (210) includes non-volatile memory (212) upon which is disposed one or more digital images (218) representing the server, the server (210) includes one or more components (214, 216) with each of the components (214, 216) including non-volatile memory (220, 224) in which is disposed one or more digital images (222, 226) representing the component, and the server (210) is connected for data communications to a management module (152). The method of FIG. 5 is also similar to the method of FIG. 2 in that the method of FIG. 5 also includes the management module's retrieving (202), the digital images (218, 222, 226), generating (204) a graphical representation (228) of the server (210) with the installed components (214, 216), and presenting (206) the graphical representation (228) to a user (100) through a GUI (140). The method of FIG. 5 is also similar to method of FIG. 4, including as it does detecting (402), by the management module (152), a fault (403) in at least one component (214, 216) installed in the server (210).

The method of FIG. 5 differs from the methods of FIG. 2 and FIG. 4, however, in that in the method of FIG. 5 generating (204) a graphical representation (228) of the server (210) with the installed components (214, 216) includes generating (502) the graphical representation (228) of the server (210) with one or more status indicators (504) specifying the at least one component in which the management module detected the fault. Generating (502) the graphical representation (228) of the server (210) with one or more status indicators (504) specifying the at least one component in which the management module detected the fault may be carried out by replacing on or more digital images in the graphical representation with digital images including the status indicators, modifying colors of one or more pixels of the graphical representation corresponding to a status indicator, or in other ways as will occur to readers of skill in the art. Such status indicators may be graphically represented as LED indicators, or as text displaced upon the graphical representations, and in other ways as will occur to readers of skill in the art.

Figure 6:
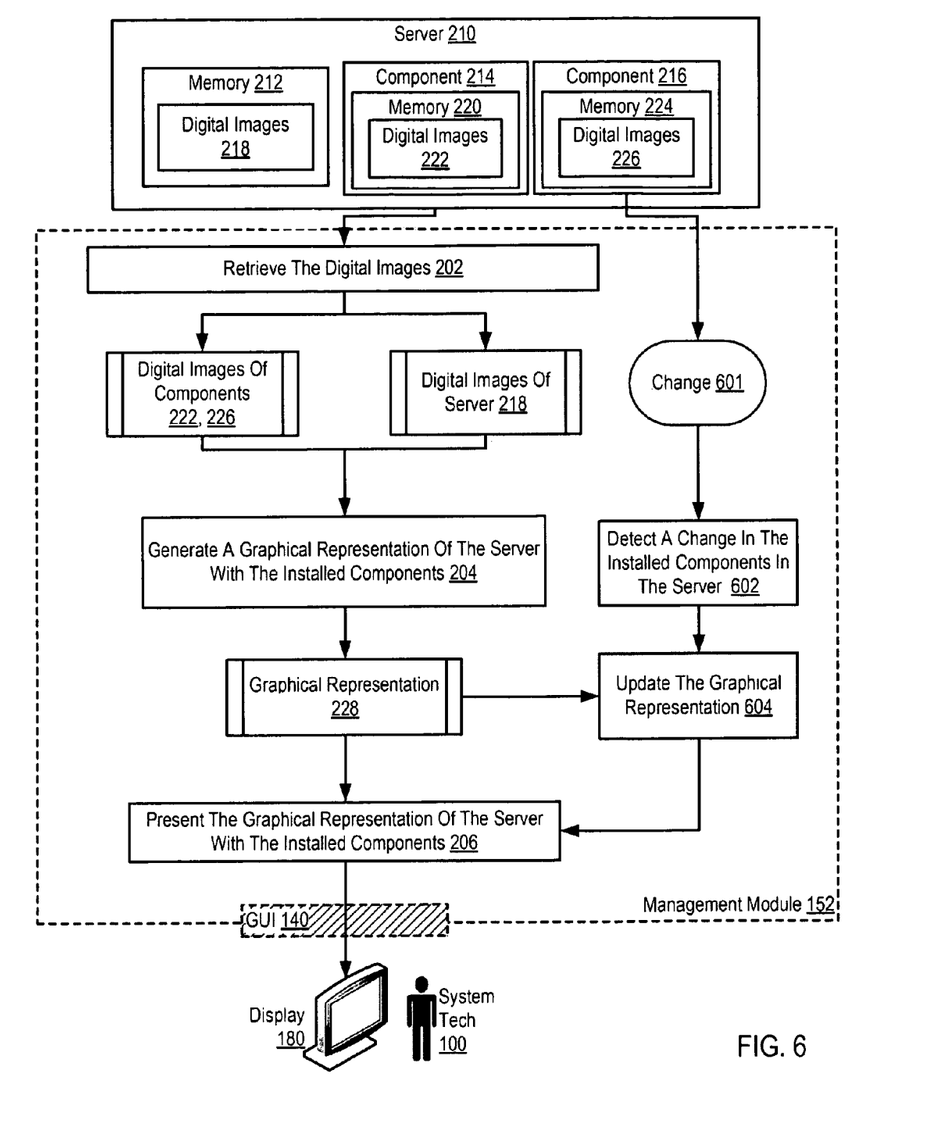
FIG. 6 sets forth a flow chart illustrating a further exemplary method for remotely administering a server according to embodiments of the present invention.

For further explanation, FIG. 6 sets forth a flow chart illustrating a further exemplary method for remotely administering a server (210) according to embodiments of the present invention. The method of FIG. 6 is similar to the method of FIG. 2 in that in the method of FIG. 6, the server (210) includes non-volatile memory (212) upon which is disposed one or more digital images (218) representing the server, the server (210) includes one or more components (214, 216) with each of the components (214, 216) including non-volatile memory (220, 224) in which is disposed one or more digital images (222, 226) representing the component, and the server (210) is connected for data communications to a management module (152). The method of FIG. 6 is also similar to the method of FIG. 2 in that the method of FIG. 6 also includes the management module's retrieving (202), the digital images (218, 222, 226), generating (204) a graphical representation (228) of the server (210) with the installed components (214, 216), and presenting (206) the graphical representation (228) to a user (100) through a GUI (140). The method of FIG. 6 is also similar to method of FIG. 4, including as it does detecting (402), by the management module (152), a fault (403) in at least one component (214, 216) installed in the server (210).

The method of FIG. 6 differs from the method of FIG. 2, however, in that the method of FIG. 6 includes detecting (602), by the management module (152), a change (601) in the installed components (214, 216) in the server (210) and updating (604), by the management module (152), the graphical representation (228) of the server (210) with the installed components to reflect the detected change (601).

Detecting (602), by the management module (152), a change (601) in the installed components (214, 216) in the server (210) may be carried out in various ways including, for example, by: receiving through an out-of-band data communications bus, a change notification from the server upon installation or removal of a component; identifying the change upon an automatic periodic polling of the servers in a server rack; or by identifying the change upon request by a system technician to poll currently installed servers for configuration changes; and so on.

Updating (604) the graphical representation (228) of the server (210) with the installed components to reflect the detected change (601) may be carried out in dependence upon the change: if the change of the installed components of the server includes an addition of a component in the server, then the management module may retrieve additional digital images from the newly installed component, overlay the presently retrieved additional digital images on the graphical representation, that is, re-generate the graphical representation of the server with the installed components; if the change of the installed components of the server includes removal of a particular component, then the management module may re-generate the graphical representation without the digital images representing that particular component, now removed from the server.

Exemplary embodiments of the present invention are described largely in the context of a fully functional computer system for remotely administering a server. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of remotely administering a server, the server comprising non-volatile memory upon which is disposed one or more digital images representing the server, the server further comprising one or more components installed in the server with each component comprising non-volatile memory in which is disposed one or more digital images representing the component, the server connected for data communications to a management module, the method comprising:
  retrieving, by the management module from the server, the digital images representing the server and the digital images representing the installed components;
  generating, by the management module with the digital images representing the server and the digital images representing the installed components, a graphical representation of the server with the installed components; and presenting, by the management module to a user through a graphical user interface ('GUI'), the graphical representation of the server with the installed components.

2. The method of claim 1 wherein:
the server is installed in a server rack that includes non-volatile memory in which is disposed one or more digital images representing the server rack, the server rack comprising computing components installed in the server rack, the computing components connected for data communications to the management module, each of the computing components comprising non-volatile memory in which is disposed one or more digital images representing the computing component, the computing components further comprising additional servers with installed components, networking devices that connect servers installed in the server rack for data communications through a data communications network, input/output ('I/O') devices, and one or more disk drive devices;
retrieving the digital images representing the server and the digital images representing the installed components further comprises retrieving the digital images representing the computing components installed in the server rack and the digital images representing the server rack;
generating a graphical representation of the server with the installed components further comprises generating, with the digital images representing the computing components installed in the server rack and the digital images representing the server rack, a graphical representation of the server rack with the installed computing components; and
presenting the graphical representation of the server with the installed components further comprises presenting the graphical representation of the server rack with the installed computing components.

3. The method of claim 2 wherein generating the graphical representation of the server rack further comprises generating a graphical representation of a topology of data communications connections among the computing components of the server rack as part of the graphical representation of the server rack.

4. The method of claim 2 wherein generating the graphical representation of the server rack further comprises generating the graphical representation of the server rack with status indicators specifying a current user of a disk drive device installed in the server rack.

5. The method of claim 1 wherein:
the method further comprises detecting, by the management module, a fault in at least one component installed in the server; and
generating a graphical representation of the server with the installed components further comprises generating the graphical representation of the server with a hyperlink embedded in the graphical representation, the hyperlink specifying a location in a fault log file that includes information describing the detected fault.

6. The method of claim 1 wherein:
the method further comprises detecting, by the management module, a fault in at least one component installed in the server; and
generating a graphical representation of the server with the installed components further comprises generating the graphical representation of the server with one or more status indicators specifying the at least one component in which the management module detected the fault.

7. The method of claim 1 further comprising:
detecting, by the management module, a change in the installed components in the server; and
updating, by the management module, the graphical representation of the server with the installed components to reflect the detected change.

8. An apparatus for remotely administering a server, the server comprising non-volatile memory upon which is disposed one or more digital images representing the server, the server further comprising one or more components installed in the server with each component comprising non-volatile memory in which is disposed one or more digital images representing the component, the server connected for data communications to a management module, the apparatus comprising a computer processor, a computer memory operatively coupled to the computer processor, the computer memory having disposed within it computer program instructions capable of:
retrieving, by the management module from the server, the digital images representing the server and the digital images representing the installed components;
generating, by the management module with the digital images representing the server and the digital images representing the installed components, a graphical representation of the server with the installed components; and
presenting, by the management module to a user through a graphical user interface (GUI), the graphical representation of the server with the installed components.

9. The apparatus of claim 8 wherein:
the server is installed in a server rack that includes non-volatile memory in which is disposed one or more digital images representing the server rack, the server rack comprising computing components installed in the server rack, the computing components connected for data communications to the management module, each of the computing components comprising non-volatile memory in which is disposed one or more digital images representing the computing component, the computing components further comprising additional servers with installed components, networking devices that connect servers installed in the server rack for data communications through a data communications network, input/output ('I/O') devices, and one or more disk drive devices;
retrieving the digital images representing the server and the digital images representing the installed components further comprises retrieving the digital images representing the computing components installed in the server rack and the digital images representing the server rack;
generating a graphical representation of the server with the installed components further comprises generating, with the digital images representing the computing components installed in the server rack and the digital images representing the server rack, a graphical representation of the server rack with the installed computing components; and
presenting the graphical representation of the server with the installed components further comprises presenting the graphical representation of the server rack with the installed computing components.

10. The apparatus of claim 9 wherein generating the graphical representation of the server rack further comprises generating a graphical representation of a topology of data communications connections among the computing components of the server rack as part of the graphical representation of the server rack.

11. The apparatus of claim 9 wherein generating the graphical representation of the server rack further comprises generating the graphical representation of the server rack with status indicators specifying a current user of a disk drive device installed in the server rack.

12. The apparatus of claim 8 wherein:
the apparatus further comprises computer program instructions capable of detecting, by the management module, a fault in at least one component installed in the server; and
generating a graphical representation of the server with the installed components further comprises generating the graphical representation of the server with a hyperlink embedded in the graphical representation, the hyperlink specifying a location in a fault log file that includes information describing the detected fault.

13. The apparatus of claim 8 wherein:
the apparatus further comprises computer program instructions capable of detecting, by the management module, a fault in at least one component installed in the server; and
generating a graphical representation of the server with the installed components further comprises generating the graphical representation of the server with one or more status indicators specifying the at least one component in which the management module detected the fault.

14. The apparatus of claim 8 further comprising computer program instructions capable of:
detecting, by the management module, a change in the installed components in the server; and
updating, by the management module, the graphical representation of the server with the installed components to reflect the detected change.

15. A computer program product for remotely administering a server, the server comprising non-volatile memory upon which is disposed one or more digital images representing the server, the server further comprising one or more components installed in the server with each component comprising non-volatile memory in which is disposed one or more digital images representing the component, the server connected for data communications to a management module, the computer program product disposed in a non-signal computer readable recordable medium, the computer program product comprising computer program instructions capable of: retrieving, by the management module from the server, the digital images representing the server and the digital images representing the installed components;
generating, by the management module with the digital images representing the server and the digital images representing the installed components, a graphical representation of the server with the installed components; and
presenting, by the management module to a user through a graphical user interface ('GUI'), the graphical representation of the server with the installed components.

16. The computer program product of claim 15 wherein:
the server is installed in a server rack that includes non-volatile memory in which is disposed one or more digital images representing the server rack, the server rack comprising computing components installed in the server rack, the computing components connected for data communications to the management module, each of the computing components comprising non-volatile memory in which is disposed one or more digital images representing the computing component, the computing components further comprising additional servers with installed components, networking devices that connect servers installed in the server rack for data communications through a data communications network, input/output ('I/O') devices, and one or more disk drive devices;
retrieving the digital images representing the server and the digital images representing the installed components further comprises retrieving the digital images representing the computing components installed in the server rack and the digital images representing the server rack;
generating a graphical representation of the server with the installed components further comprises generating, with the digital images representing the computing components installed in the server rack and the digital images representing the server rack, a graphical representation of the server rack with the installed computing components; and
presenting the graphical representation of the server with the installed components further comprises presenting the graphical representation of the server rack with the installed computing components.

17. The computer program product of claim 16 wherein generating the graphical representation of the server rack further comprises generating a graphical representation of a topology of data communications connections among the computing components of the server rack as part of the graphical representation of the server rack.

18. The computer program product of claim 16 wherein generating the graphical representation of the server rack further comprises generating the graphical representation of the server rack with status indicators specifying a current user of a disk drive device installed in the server rack.

19. The computer program product of claim 15 wherein:
the computer program product further comprises computer program instructions capable of detecting, by the management module, a fault in at least one component installed in the server; and
generating a graphical representation of the server with the installed components further comprises generating the graphical representation of the server with a hyperlink embedded in the graphical representation, the hyperlink specifying a location in a fault log file that includes information describing the detected fault.

20. The computer program product of claim 15 wherein:
the computer program product further comprises computer program instructions capable of detecting, by the management module, a fault in at least one component installed in the server; and
generating a graphical representation of the server with the installed components further comprises generating the graphical representation of the server with one or more status indicators specifying the at least one component in which the management module detected the fault.

* * * * *